(12) United States Patent
Aumann

(10) Patent No.: US 9,876,399 B2
(45) Date of Patent: Jan. 23, 2018

(54) STATOR FOR AN ELECTRIC MACHINE

(71) Applicant: Robert Bosch GmbH, Stuttgart (DE)

(72) Inventor: Christian Aumann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 296 days.

(21) Appl. No.: 14/654,651

(22) PCT Filed: Dec. 11, 2013

(86) PCT No.: PCT/EP2013/076286
§ 371 (c)(1),
(2) Date: Jun. 22, 2015

(87) PCT Pub. No.: WO2014/095535
PCT Pub. Date: Jun. 26, 2014

(65) Prior Publication Data
US 2015/0364955 A1   Dec. 17, 2015

(30) Foreign Application Priority Data

Dec. 21, 2012   (DE) .................. 10 2012 224 153

(51) Int. Cl.
| H02K 1/18 | (2006.01) |
| H02K 3/38 | (2006.01) |
| H02K 1/14 | (2006.01) |
| H02K 3/52 | (2006.01) |
| H02K 1/16 | (2006.01) |

(52) U.S. Cl.
CPC ............... *H02K 1/18* (2013.01); *H02K 1/146* (2013.01); *H02K 1/165* (2013.01); *H02K 3/38* (2013.01); *H02K 3/522* (2013.01); *H02K 2201/06* (2013.01)

(58) Field of Classification Search
CPC .......... H02K 1/18; H02K 1/148; H02K 1/165; H02K 3/38; H02K 3/522
See application file for complete search history.

(56) References Cited

U.S. PATENT DOCUMENTS

| 2,876,371 | A | * | 3/1959 | Wesolowski | ............. H02K 1/16 |
| | | | | | 29/609 |
| 4,340,829 | A | | 7/1982 | McCoy | |
| 4,485,320 | A | * | 11/1984 | Kawada | .................. H02K 1/12 |
| | | | | | 310/216.049 |

(Continued)

FOREIGN PATENT DOCUMENTS

| CN | 201608566 U | 10/2010 |
| EP | 1278293 | 1/2003 |
| WO | 2011046295 | 4/2011 |

OTHER PUBLICATIONS

International Search Report for Application No. PCT/EP2013/076286 dated Nov. 10, 2014 (English Translation, 3 pages).

*Primary Examiner* — Robert W Horn
(74) *Attorney, Agent, or Firm* — Michael Best & Friedrich LLP

(57) ABSTRACT

The invention concerns a stator for an electric machine, comprising a plate stack comprising a plurality of superposed stator plates, the plate stack being delimited at the ends by cover plates and an insulating plate being disposed on at least one cover plate in the plate stack, the insulating plate interlocking with the adjacent cover plate.

12 Claims, 11 Drawing Sheets

(56) References Cited

U.S. PATENT DOCUMENTS

| | | | | |
|---|---|---|---|---|
| 4,578,852 A * | 4/1986 | Sauerwein | H02K 1/185 | 29/525 |
| 4,603,273 A * | 7/1986 | McDonald | H02K 5/15 | 310/216.132 |
| 4,642,502 A * | 2/1987 | Carpenter | H02K 1/278 | 310/156.12 |
| 4,765,054 A * | 8/1988 | Sauerwein | H02K 1/185 | 29/596 |
| 4,818,911 A * | 4/1989 | Taguchi | H02K 1/148 | 310/194 |
| 4,825,114 A * | 4/1989 | Ohtsuka | H02K 1/187 | 310/216.115 |
| 4,885,496 A * | 12/1989 | Wheeler | H02K 3/38 | 29/596 |
| 5,398,397 A * | 3/1995 | Johnson | H02K 15/024 | 180/65.6 |
| 6,608,420 B2 * | 8/2003 | Hsieh | H02K 1/148 | 310/254.1 |
| 7,342,334 B2 * | 3/2008 | Hilton | H02K 1/04 | 310/194 |
| 8,141,231 B2 * | 3/2012 | Wolfe, Jr. | H02K 5/148 | 29/596 |
| 8,450,898 B2 * | 5/2013 | Sears | H02K 3/522 | 310/194 |
| 8,917,006 B2 * | 12/2014 | Jang | H02K 3/345 | 310/214 |
| 9,438,079 B2 * | 9/2016 | Nace | H02K 9/06 | |
| 2004/0061409 A1 * | 4/2004 | Grant | H02K 15/024 | 310/216.057 |
| 2004/0119350 A1 * | 6/2004 | Miya | H02K 3/522 | 310/71 |
| 2004/0195926 A1 * | 10/2004 | Hiwaki | H02K 1/146 | 310/214 |
| 2006/0012261 A1 | 1/2006 | Ku et al. | | |
| 2009/0324435 A1 | 12/2009 | Sears et al. | | |
| 2015/0349600 A1 * | 12/2015 | Huber | H02K 3/522 | 310/43 |
| 2015/0364955 A1 * | 12/2015 | Aumann | H02K 3/38 | 310/216.012 |

* cited by examiner

STATOR FOR AN ELECTRIC MACHINE

BACKGROUND OF THE INVENTION

The invention relates to a stator for an electric machine.

Stators for electric machines which are constructed from a laminate stack which is formed from a plurality of stator laminations including a sheet metal material which are positioned one on top of the other are known. The laminate stack is delimited at both opposite end sides by in each case one end or covering lamination which is likewise manufactured from sheet metal and which is adjoined by an insulating lamination including an electrically insulating material. One of the insulating laminations is connected on the side remote from the laminate stack to a connection plate, via which coil windings which are accommodated in the stator are connected to the power supply.

During fitting of the stator, first the laminate stack is assembled from the individual laminations, then the winding is performed in a winding machine. In this case, care should be taken to ensure that the individual component parts of the stator maintain their relative position with respect to one another.

SUMMARY OF THE INVENTION

The invention is based on the object of designing a stator for an electric machine to be fitting friendly using simple design measures.

The stator according to the invention is used in electric machines, for example in drive motors, which are used in motor vehicles or in hand held machine tools. The electric machine is, for example, an internal rotor motor comprising an outer, surrounding stator and an inner rotor.

The stator has a laminate stack, which includes a plurality of individual stator laminations positioned one on top of the other, which are manufactured, for example, from a sheet metal material, in particular punched out of a metal sheet. The end side laminations of the laminate stack form the end or covering laminations, wherein an insulating lamination including an electrically insulating material adjoins at least one covering lamination. In the stator according to the invention, the insulating lamination is connected in a form fitting manner at least to the covering lamination which is directly adjacent. This embodiment has the advantage that prefixing and positioning of the individual parts of the laminate stack is provided so that, once the stator laminations have been layered one on top of the other to form the laminate stack and the insulating lamination has been applied, a prefabricated structural unit is produced, which can be supplied to the winding machine, wherein the risk of the individual parts of the laminate stack becoming detached from one another again is significantly reduced. The winding process, i.e. the application of stator windings to stator teeth which are formed on the laminate stack, can be performed in the winding machine. The form fitting connection between the insulating lamination and the adjacent covering lamination can be produced easily during production of the laminate stack.

The form fitting connection is produced via a form fitting connection element, for example a fixing bolt, which protrudes into an assigned cutout. The fixing bolt is advantageously arranged on the insulating lamination, and the cutout is introduced into the covering lamination. The fixing bolt can possibly be formed integrally with the insulating lamination, in particular in an embodiment of the insulating lamination as plastic component part, for example as plastic injection molded component part. Furthermore, it is expedient to provide a plurality of fixing bolts distributed over the circumference, which fixing bolts protrude into assigned cutouts in the covering lamination. The connection via the fixing bolt and the cutout is performed in the circumferential direction and in the radial direction in a form fitting manner, possibly also in the axial direction. The fixing bolt can be inserted into the cutout with pressure, as a result of which friction locking between the wall of the fixing bolt and the wall sections adjoining the cutout is produced. In the case of a deformation of the fixing bolt, in particular in the case where the insulating lamination including the fixing bolt is formed from plastic, a form fitting connection can also be produced in the axial direction by a recess between the fixing bolt and the cutout.

The cutout in the covering lamination is advantageously produced by punching. Furthermore, it is expedient that the cutout is arranged with a spacing with respect to the circumferential side of the covering lamination, with the result that the cutout is completely surrounded by material of the covering lamination. In this way, a form fitting connection is achieved between the insulating lamination and the covering lamination in all directions orthogonal to the longitudinal axis.

In accordance with a further expedient embodiment, the fixing bolt protrudes not only into the covering lamination, but into a cutout in at least one further stator lamination, which follows the covering lamination. Possibly, a plurality of stator laminations following on directly from the covering lamination can be provided with cutouts, which are aligned with the cutout in the covering lamination and into which the fixing bolt protrudes. The cutouts in the further stator laminations can be open towards the circumferential side and are advantageously introduced by punching, in the same way as the cutout in the covering lamination. Furthermore, it is expedient that the cutout in the stator lamination is in the form of a slot with a longitudinal extent in the circumferential direction. In the case of angled stators, which have coil windings running at an angle in relation to the stator longitudinal axis, by virtue of the cutout being embodied as a slot, account is taken of the angular shift between the covering lamination and the following stator lamination(s). The embodiment as a slot enables axial insertion of the fixing bolt despite the angular offset between the successive laminations. The cutout in the covering lamination, on the other hand, advantageously corresponds to the cross section of the fixing bolt.

In accordance with a further expedient embodiment, the insulating lamination is connected in a form fitting manner to an interconnecting disk (connection plate) on the side remote from the laminate stack, via which interconnecting disk power is supplied to the coil windings in the stator. The insulating lamination is therefore connected in a form fitting manner to the facing covering lamination of the laminate stack in the region of an end side and connected in a form fitting manner to the facing interconnecting disk in the region of the opposite end side remote from the covering lamination.

The connection to the interconnecting disk is performed via a further form fitting connection element, which possibly coincides with the fixing bolt. For example, the fixing bolt can have a first and a second bolt section, which protrude beyond the insulating lamination on opposite end sides, wherein the first bolt section protrudes into the cutout in the covering lamination and the second bolt section protrudes into a cutout which is introduced into the interconnecting disk. Thus, a dual function is provided for the fixing bolt, namely firstly the form fitting connection to the covering lamination and secondly the form fitting connection to the interconnecting disk.

The cutout in the interconnecting disk into which the bolt section protrudes can be open radially inwards. Thus, there is a form fitting connection radially outwards and in the circumferential direction.

In order to improve the connection between the fixing bolt and the cutout, clamping ribs can be arranged on the lateral surface of the fixing bolt, said clamping ribs being inserted axially into the cutout with pressure. Such pressing ribs can be arranged both on the first and on the second bolt sections of the fixing bolt.

BRIEF DESCRIPTION OF THE DRAWINGS

Further advantages and expedient embodiments are set forth in the further claims, the description of the figures and the drawings, in which:

Identical component parts have been provided with the same reference symbols in the figures.

DETAILED DESCRIPTION

Figure 1:
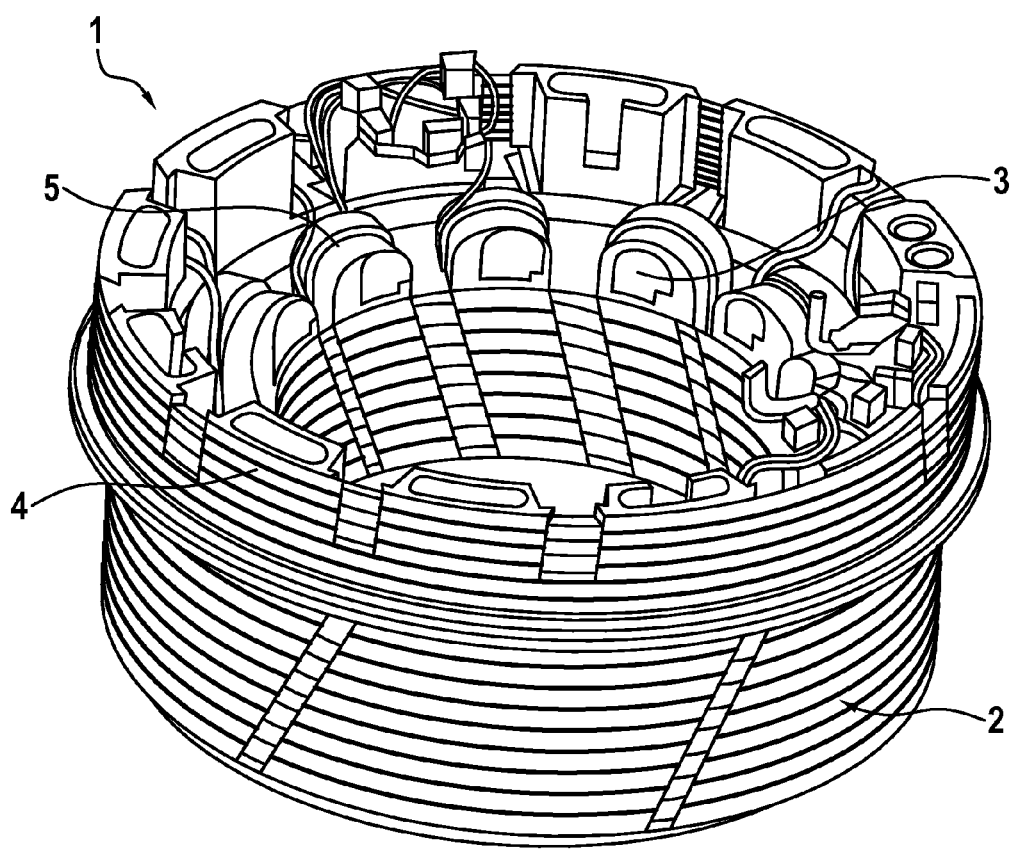
FIG. 1 shows a perspective view of a stator comprising a laminate stack and an interconnecting disk positioned on the end side.

FIG. 1 shows a stator 1 for an electric machine, in particular for an electric internal rotor motor. The stator 1 has a stator stack or laminate stack 2, which is constructed from a multiplicity of individual stator laminations which are stacked one on top of the other. Furthermore, an interconnecting disk 4 is arranged on the end side of the laminate stack 2, via which interconnecting disk power is supplied to windings 5 in the laminate stack 2. An insulating lamination 3, which includes an electrically insulating material in particular of plastic, is arranged between the laminate stack 2 and the interconnecting disk 4. The insulating lamination 3 can be in the form of a plastic injection molded component part. A corresponding insulating lamination is also located on the opposite axial end side of the laminate stack 2.

The laminate stack 2 is angled and has carrier teeth pointing radially inwards, with the windings 5 being laid around said carrier teeth. Owing to the angled arrangement, the windings 5 extend at an angle to the stator longitudinal axis.

Figure 2:
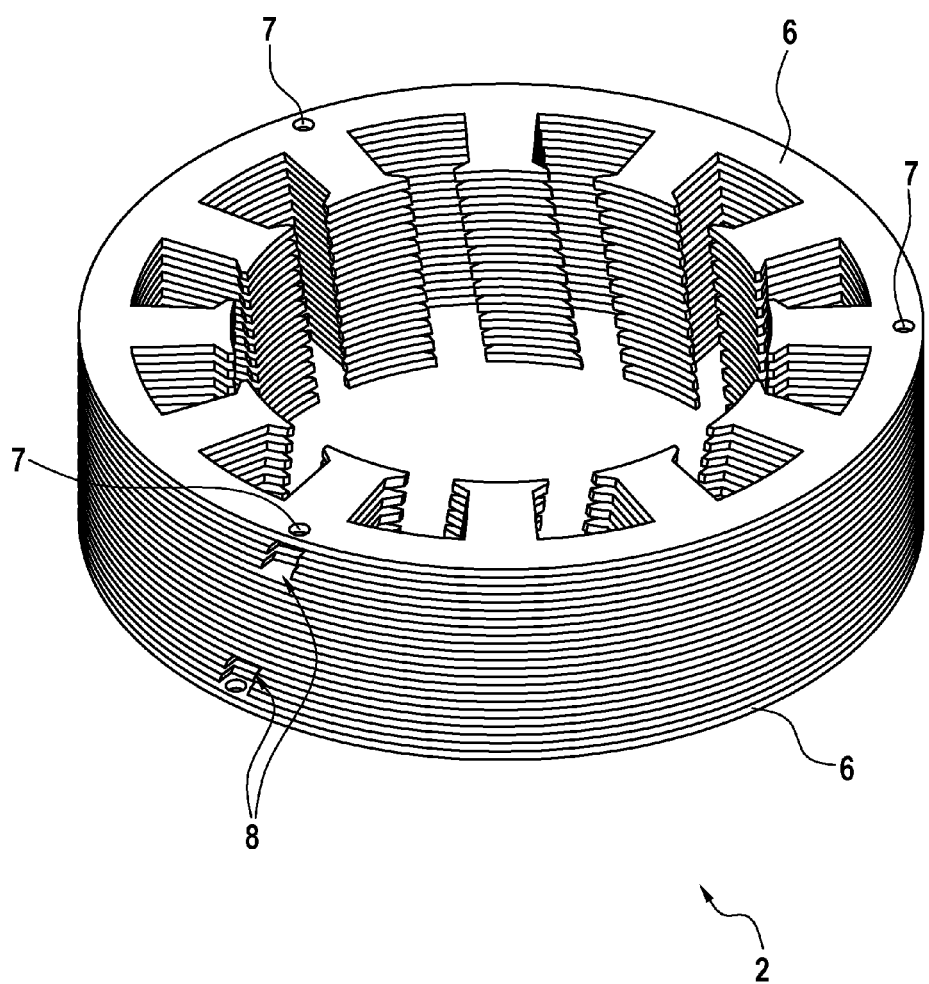
FIG. 2 shows a laminate stack of the stator in a perspective view.

FIG. 2 shows the laminate stack 2 in a perspective detail illustration. The laminate stack includes a multiplicity of stator laminations layered one on top of the other, wherein the end side terminating laminations form the end or covering laminations 6. Each lamination of the laminate stack is punched out of a metal sheet and has an outer carrier ring, on which carrier teeth formed integrally for accommodating the windings extend radially inwards.

In total three cutouts 7, distributed uniformly over the circumference, are introduced into the covering laminations 6, said cutouts having a round cross section and being arranged at a spacing with respect to the circumferential side. The cutouts 7 are located completely within the covering laminations 6. Further cutouts or recesses 8 in the directly adjacent stator laminations correspond to the cutouts 7; the recesses 8 are open towards the circumferential side and are axially aligned with the cutouts 7 in the end side covering laminations 6. The recesses 8 have, when viewed in the plane of the laminations, a slot shape with a longitudinal extent in the circumferential direction. This makes it possible for an axially continuous opening to be formed between the covering lamination 6 and the directly adjacent stator laminations despite the angular offset between the various stator laminations. This axial opening is used for receiving a form fitting connection element, which is arranged on the insulating lamination.

Figure 3:
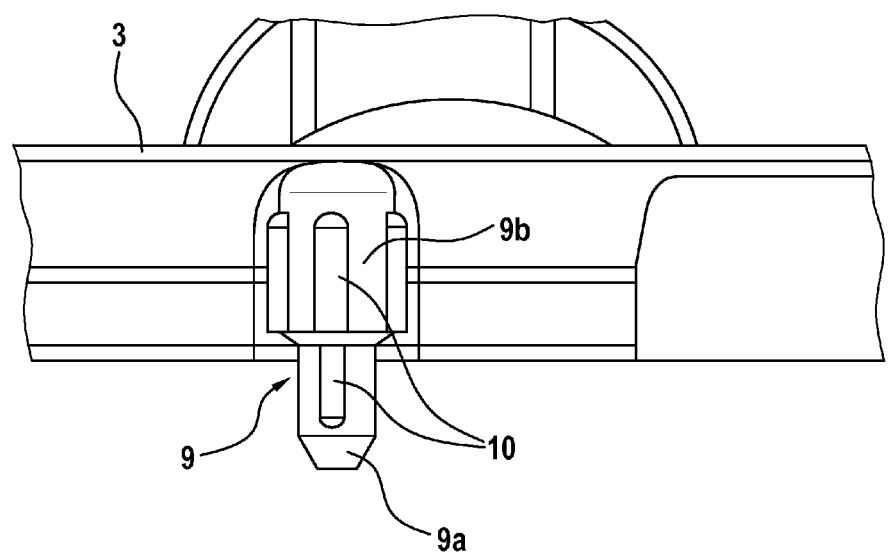
FIG. 3 shows a detail of an insulating lamination, which is arranged between the laminate stack and the interconnecting disk, comprising a fixing bolt.

Such a form fitting connection element is illustrated in FIG. 3, which shows a detail of an insulating lamination 3. The form fitting connection element is formed by a fixing bolt 9, which is formed integrally with the insulating lamination 3 and has a lower bolt section 9a and an upper bolt section 9b, wherein the lower bolt section 9a protrudes beyond the lower end side of the insulating lamination 3. The upper bolt section 9b can possibly protrude beyond the upper end side of the insulating lamination 3 or protrude upwards at least beyond the directly surrounding sections of the insulating lamination. This makes it possible for the lower bolt section 9a to be inserted into the cutouts or recesses 7, 8 in the covering lamination 6 or the adjoining stator laminations and for the upper bolt section 9b to be inserted into associated cutouts in the interconnecting disk 4. In this way, a form fitting connection can be produced, firstly between the insulating lamination 3 and the laminate stack 2 and secondly between the insulating lamination 3 and the interconnecting disk 4.

Clamping ribs 10 which extend in the axial direction of the fixing bolt are arranged on the lateral surface of the fixing bolt 9. In each case clamping ribs 10 are arranged both on the lower bolt section 9a and on the upper bolt section 9b. The lower bolt section 9a, which engages in the cutouts 7 and 8 in the laminations of the laminate stack, has a smaller outer diameter than the upper bolt section 9b, which is intended for engagement in assigned cutouts in the interconnecting plate 4.

Figure 4:
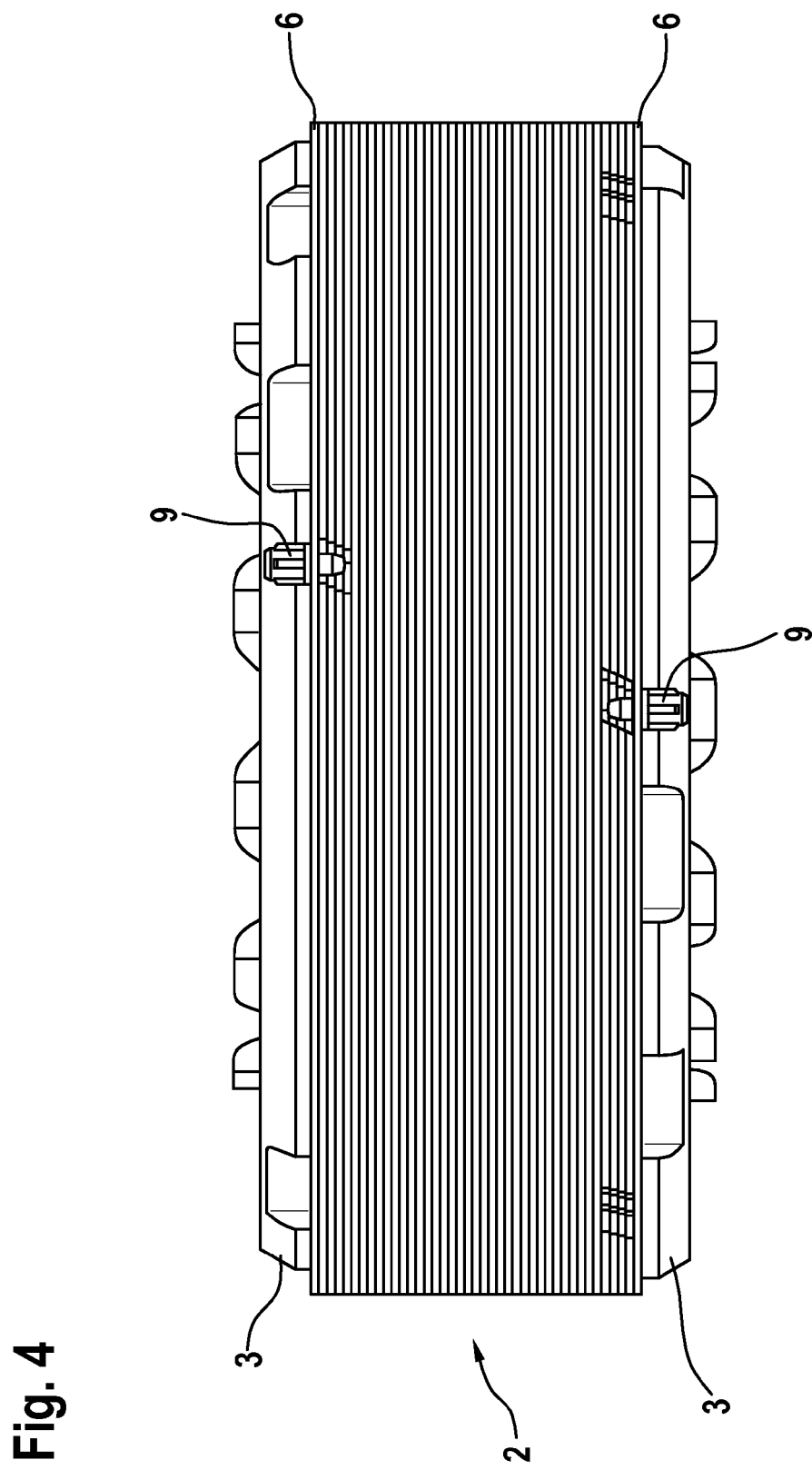
FIG. 4 shows the laminate stack comprising insulating laminations arranged on both end sides, illustrated in a side view.
Figure 5:
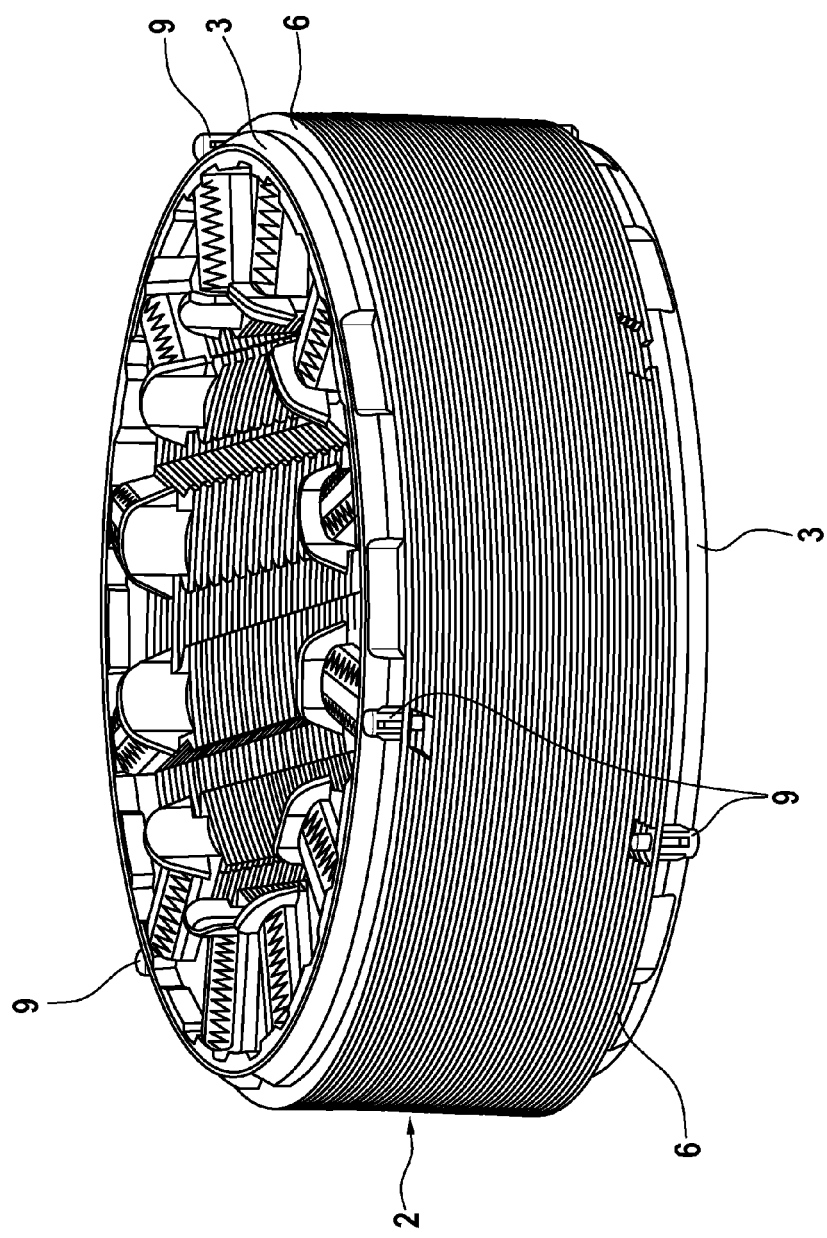
FIG. 5 shows the laminate stack comprising insulating laminations in a perspective view.

The laminate stack 2 comprising insulating laminations 3 on both end sides is illustrated in FIGS. 4 and 5. The perspective illustration shown in FIG. 5 shows that in total three fixing bolts 9 are arranged, distributed over the circumference, on the insulating lamination 3. Corresponding cutouts for receiving the fixing bolts 9 are introduced into the stator laminations including the covering laminations 6.

Figure 6:
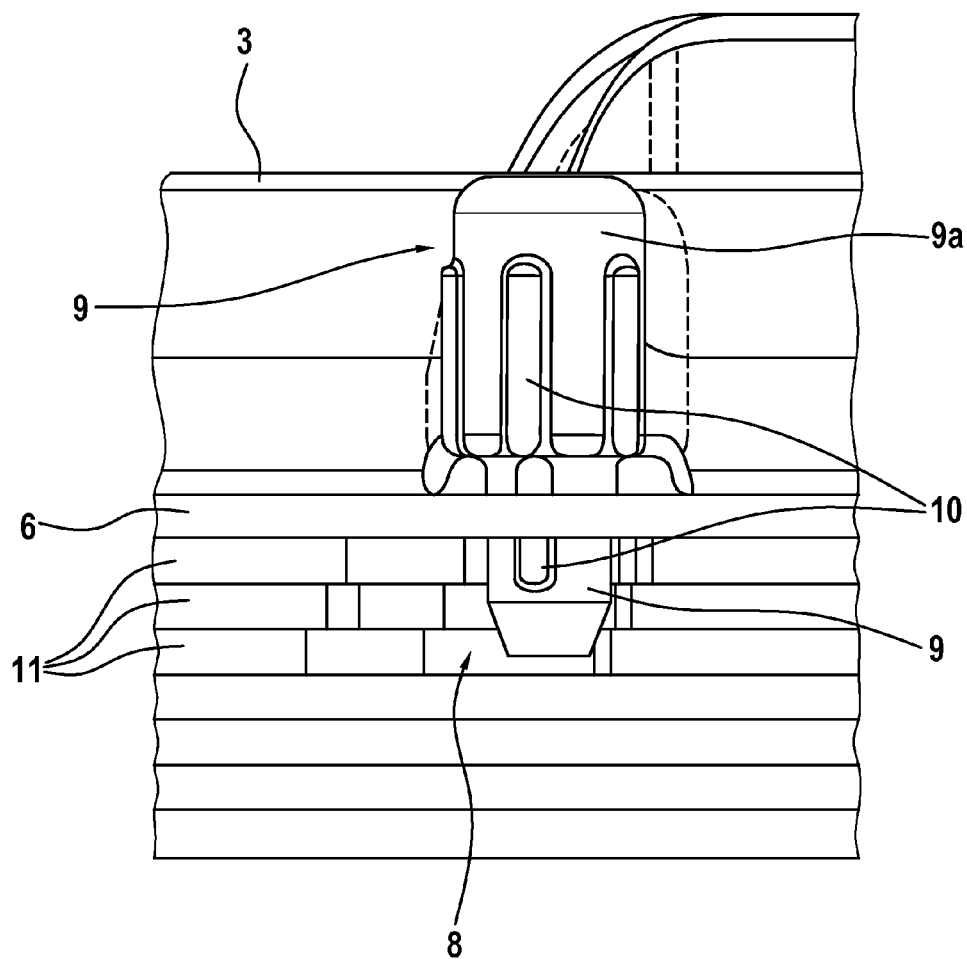
FIG. 6 shows a detailed illustration of a fixing bolt, which protrudes into cutouts in the covering lamination or the stator laminations following on therefrom.
Figure 7:
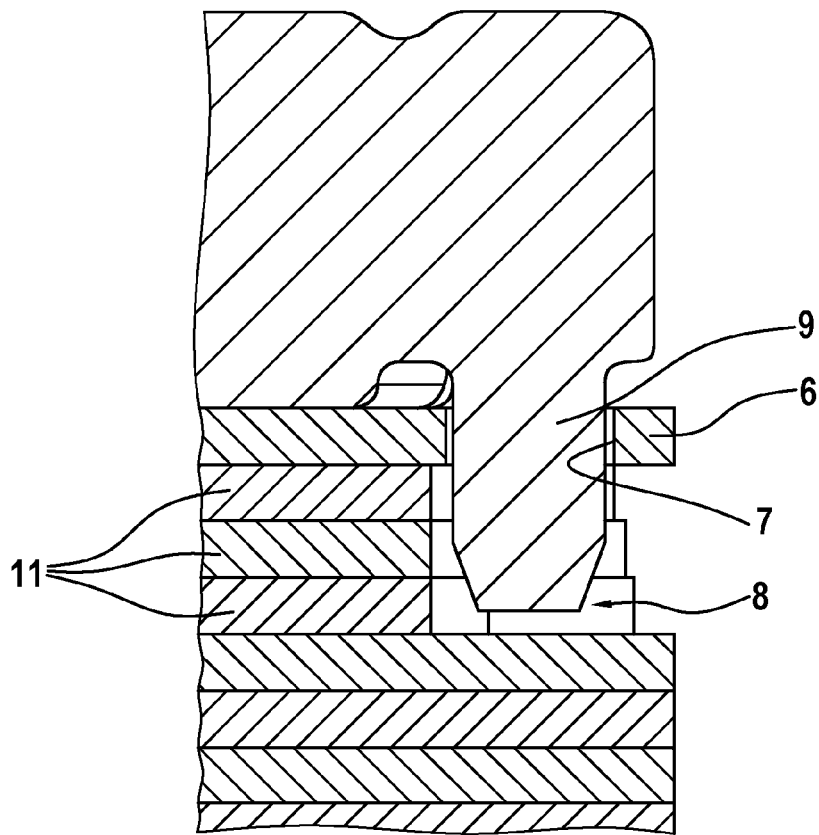
FIG. 7 shows a sectional illustration of the fixing bolt, which protrudes into the cutout in the covering lamination or the stator laminations following on therefrom.

FIG. 6 and FIG. 7 show the engagement of the fixing bolt 9 in the cutout 7 in the covering lamination 6 and the cutouts or recesses 8 in three stator laminations 11 directly adjacent to the covering lamination 6. The cutouts 8 in the stator laminations 11 are open towards the circumferential side, whereas the cutout 7 in the covering lamination 6 has a circumferential, closed wall; the cutout 7 is located at a spacing with respect to the circumferential side of the covering lamination.

Figure 8:
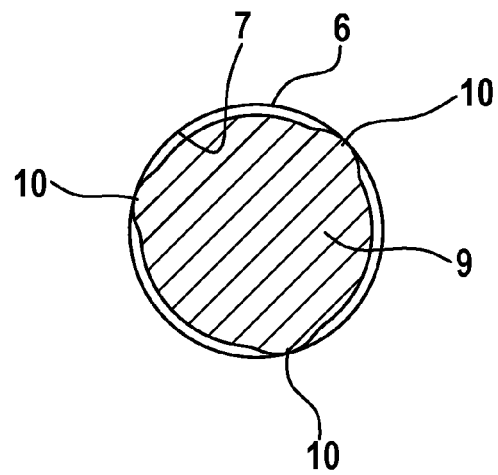
FIG. 8 shows a section transverse to the longitudinal axis of the fixing bolt.

The sectional illustration shown in FIG. 8 shows that the clamping ribs 10, which are arranged on the lateral surface of the fixing bolt 9 and protrude radially beyond the lateral surface, bear against that wall of the covering lamination 6 which adjoins the cutout 7, in the inserted state. In total three clamping ribs 10 are arranged, distributed over the circumference, on the lateral surface of the fixing bolt 9, wherein the clamping ribs extend in the direction of the longitudinal axis of the fixing bolt.

Figure 9:
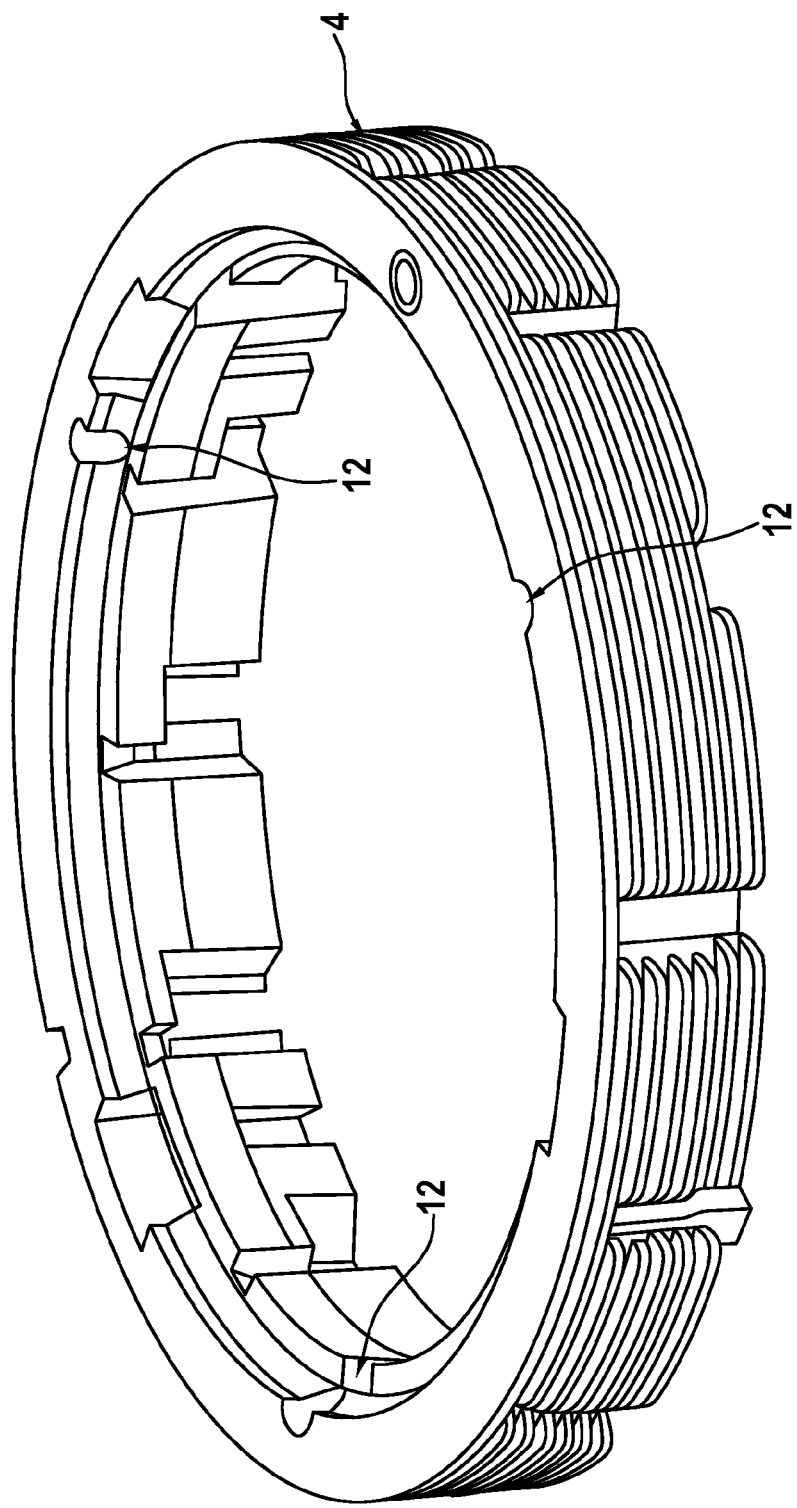
FIG. 9 shows the interconnecting disk in a perspective detail illustration.

FIG. 9 shows an interconnecting disk 4 in a perspective detail illustration. It can be seen that in total three cutouts 12 are introduced into the interconnecting disk 4, distributed over the circumference in the region of an end side, wherein the cutouts 12 are open radially inwards. The cutouts 12 are used for receiving the upper bolt section 9b of the fixing bolt 9. That end side of the interconnecting disk 4 which points upwards in FIG. 9 points downwards in the illustrations in FIGS. 1 and 10 and faces the insulating lamination.

Figure 10:
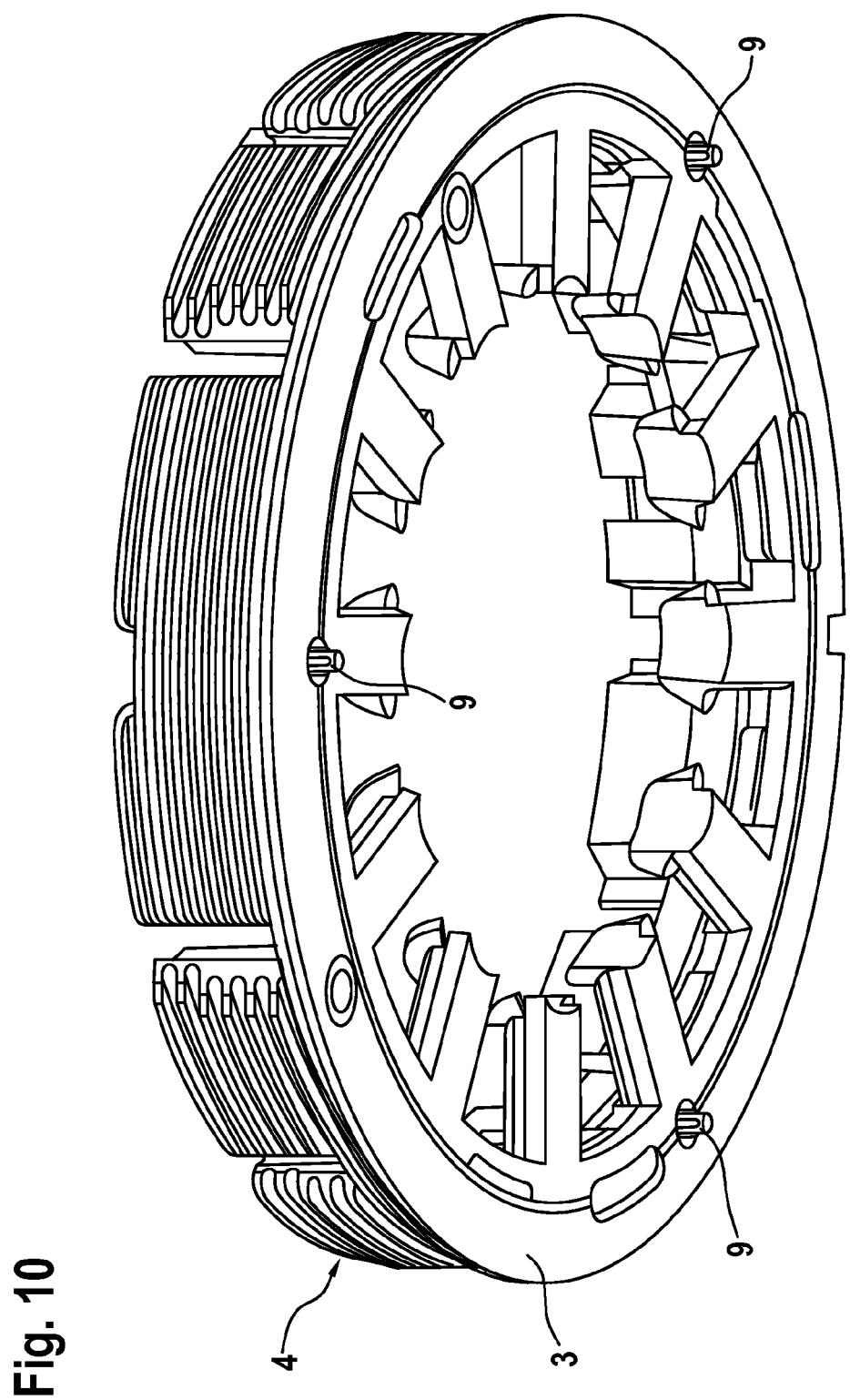
FIG. 10 shows a perspective view of an insulation lamination and the interconnecting disk.

FIG. 10 illustrates the insulating laminations 3 and the interconnecting plate 4 in the connected state. That section of the fixing bolt 9 which protrudes downwards beyond the end side is used for engagement in the assigned cutouts in the laminate stack therebeneath.

Figure 11:
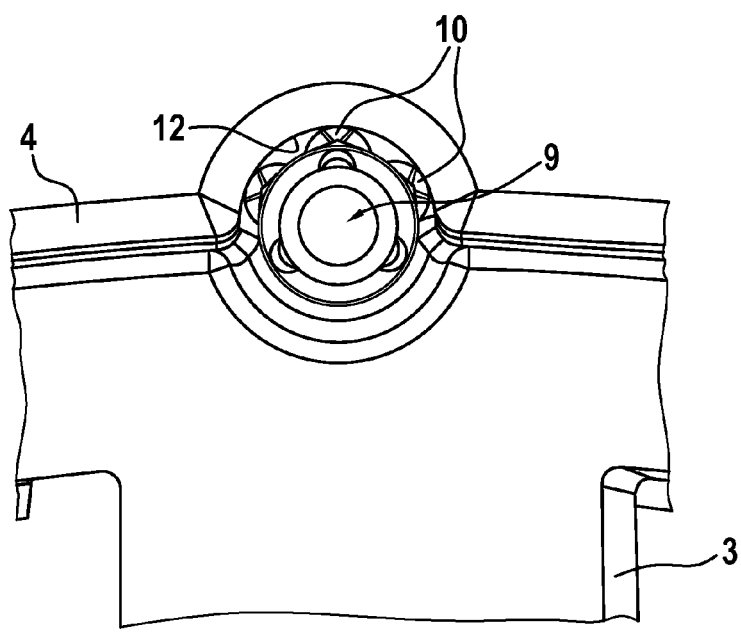
FIG. 11 shows, in plan view, the connection between a bolt section of the fixing bolt on the insulating lamination and the interconnecting disk.
Figure 12:
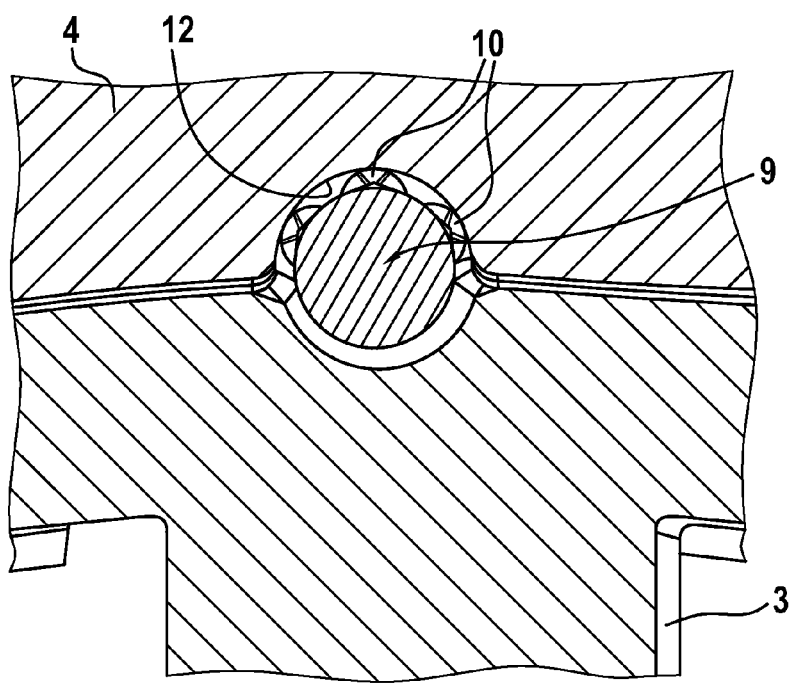
FIG. 12 shows the connection between the fixing bolt and the interconnecting disk in the section transverse to the bolt longitudinal axis.

The detail illustrations in FIGS. 11 and 12 show the engagement of the bolt section of the fixing bolt 9 in the cutout 12 in the interconnecting disk 4. The cutout 12 is approximately semicircular, and the clamping ribs 10 on the bolt section of the fixing bolt 9 extend over an angular segment of less than 180° on the lateral surface of the fixing bolt.

Figure 13:
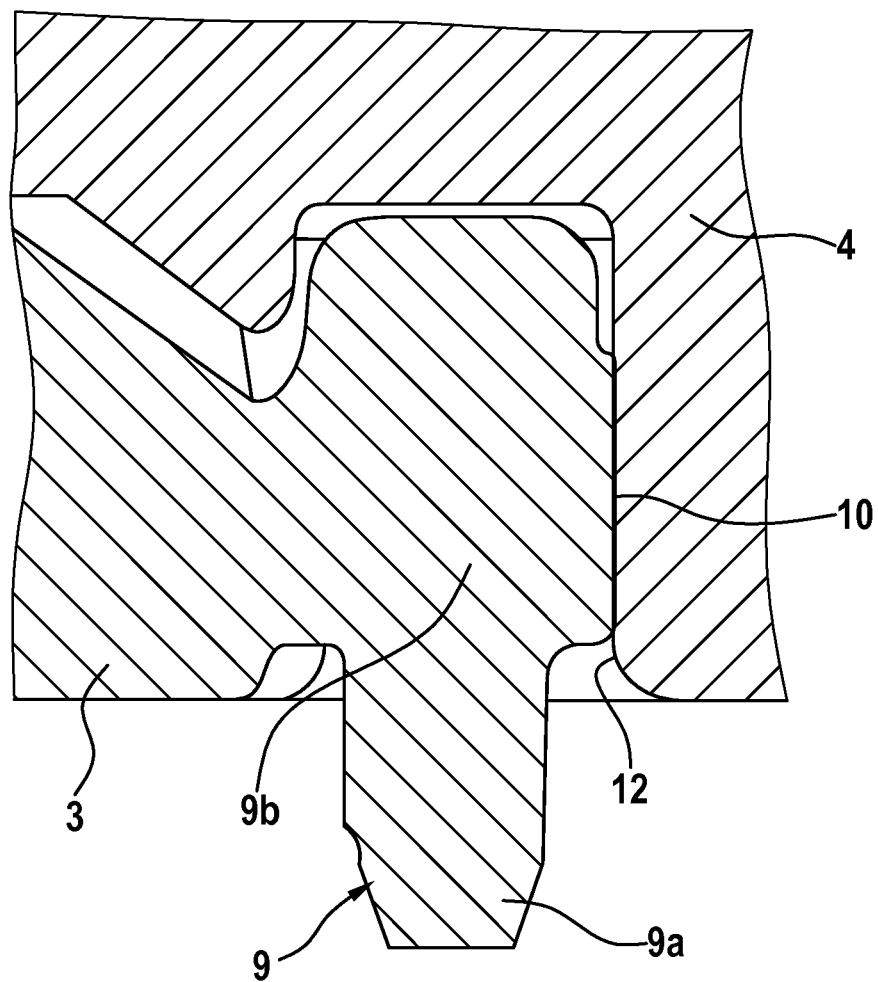
FIG. 13 shows the connection between the fixing bolt and the interconnecting disk in the longitudinal section through the fixing bolt.

FIG. 13 shows a longitudinal section through the fixing bolt 9, which is in engagement with the cutout 12 in the interconnecting plate 4. The upper section 9b of the fixing bolt 9 protrudes into the cutout 12 in the interconnecting plate 4, wherein the clamping ribs 10 on the outer lateral surface are pressed together so that the fixing bolt 9 rests in the cutout 12 with a radial pressing force.

The invention claimed is:

1. A stator for an electric machine, comprising a laminate stack (2), including a plurality of stator laminations (11) positioned one on top of the other, wherein the laminate stack (2) is delimited at end sides by covering laminations (6) and an insulating lamination (3) is arranged on at least one covering lamination (6) of the laminate stack (2), characterized in that the insulating lamination (3) is connected at least to the covering lamination (6) which is directly adjacent, wherein at least one fixing bolt, which protrudes into an assigned cutout in the covering lamination, is arranged on the insulating lamination,
wherein the fixing bolt protrudes into a cutout in at least one further stator lamination which follows the covering lamination, and
wherein the cutout is open at a circumference of the at least one further stator lamination.

2. The stator as claimed in claim 1, characterized in that the fixing bolt (9) is formed integrally with the insulating lamination (3).

3. The stator as claimed in claim 1, characterized in that the cutout (7) is arranged in the covering lamination (6) with a spacing from a circumference thereof.

4. The stator as claimed in claim 1, characterized in that the cutout (7) in the further stator lamination (11) is in the form of a slot with a longitudinal extent in a circumferential direction which is greater than a dimension of the fixing bolt (9) in the circumferential direction.

5. The stator as claimed in claim 1, characterized in that the insulating lamination (3) is connected to an interconnecting disk (4), which adjoins the laminate stack (2) at an end side.

6. The stator as claimed in claim 5, characterized in that the fixing bolt (9) has a first bolt section and a second bolt section (9a, 9b), which protrude beyond the insulating lamination (3) on opposite end sides, wherein the first bolt section (9a) protrudes into the cutout (7) in the covering lamination (6), and the second bolt section (9b) protrudes into a cutout (7) in the interconnecting disk (4).

7. The stator as claimed in claim 6, characterized in that the cutout (7) in the interconnecting disk (4) is open at a circumference of the at least one further stator lamination.

8. The stator as claimed in claim 5, characterized in that the first and second bolt sections (9a, 9b) are provided with clamping ribs (10) on a circumference of the bolt sections (9a, 9b).

9. The stator as claimed in claim 1, characterized in that the insulating lamination (3) is manufactured from plastic.

10. An electric machine comprising a stator (1) as claimed in claim 1, wherein the stator laminations (11) positioned one on top of the other are arranged so as to be rotated through a specific angle relative to one another with respect to a circumferential direction, as a result of which stator teeth are formed, whose longitudinal axis is arranged at an angle to the axis of rotation of the rotor arranged in the stator.

11. The stator as claimed in claim 1, characterized in that the cutout (7) in the further stator lamination (11) is in the form of a slot with a longitudinal extent in a circumferential direction which is greater than a dimension of the fixing bolt (9) in the circumferential direction, and the cutouts (7) are arranged offset with respect to one another in the circumferential direction.

12. The stator as claimed in claim 1, characterized in that the insulating lamination (3) is connected integrally to an interconnecting disk (4), which adjoins the laminate stack (2) at the end side.

* * * * *